(12) United States Patent  (10) Patent No.: US 7,431,346 B2
Frost et al.  (45) Date of Patent: Oct. 7, 2008

(54) QUICK CONNECT COUPLING

(75) Inventors: Brian L. Frost, Mt. Juliet, TN (US); Jeffery G. Ricker, Old Hickory, TN (US); Roger E. DeYoung, Franklin, TN (US); Thomas A. Burdsall, Nashville, TN (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 44 days.

(21) Appl. No.: 11/348,430

(22) Filed: Feb. 6, 2006

(65) Prior Publication Data

US 2007/0114794 A1    May 24, 2007

Related U.S. Application Data

(60) Provisional application No. 60/738,672, filed on Nov. 21, 2005.

(51) Int. Cl.
F16L 39/00    (2006.01)

(52) U.S. Cl. .................... 285/317; 285/86; 285/307; 285/308; 285/316

(58) Field of Classification Search ............ 285/84–86, 285/307–308, 317, 913, 920, 316
See application file for complete search history.

(56) References Cited

U.S. PATENT DOCUMENTS

| 736,908 | A | | 8/1903 | Wright |
| 2,069,377 | A | | 2/1937 | Matthiessen |
| 2,860,893 | A | | 11/1958 | Clark |
| 2,888,278 | A | | 5/1959 | Terres et al. |
| 3,134,613 | A | | 5/1964 | Regan |
| 3,252,721 | A | * | 5/1966 | Weasler ............... 403/318 |
| 3,761,117 | A | | 9/1973 | Shendure |
| 4,591,192 | A | | 5/1986 | Van Exel et al. |
| 4,834,423 | A | | 5/1989 | DeLand |
| 5,005,877 | A | | 4/1991 | Hayman |
| 5,048,874 | A | | 9/1991 | Ohlsson |
| 5,116,086 | A | | 5/1992 | Psajd |
| 5,332,266 | A | * | 7/1994 | Canale ............... 285/7 |
| 5,439,258 | A | | 8/1995 | Yates |
| 5,887,911 | A | | 3/1999 | Kargula |
| 6,129,390 | A | | 10/2000 | Ohlsson |

(Continued)

FOREIGN PATENT DOCUMENTS

CN    2150971 Y    12/1993

(Continued)

*Primary Examiner*—Aaron M Dunwoody
*Assistant Examiner*—Fannie Kee
(74) *Attorney, Agent, or Firm*—Jones Day

(57) ABSTRACT

A socket of a fluid coupling device includes a housing with a cavity centered on an axis. A pawl, attached to the housing, is pivotable about a pivot location relative to the housing, and has a catch section located axially outward from the pivot location. A spring biases the catch section radially inward. A plug is configured to move axially into the cavity while sliding against the catch section to move the catch section radially outward, against bias of the spring, out of the way of the plug. After an axially-outwardly facing catch surface of the plug passes the catch section, the catch section can pivot radially inward and abut the plug catch surface to capture the plug in the socket.

19 Claims, 4 Drawing Sheets

U.S. PATENT DOCUMENTS 6,168,213 B1 * 1/2001 Muller ............... 285/391
6,244,961 B1   6/2001 Kleiner

FOREIGN PATENT DOCUMENTS

| | | |
|---|---|---|
| CN | 1051835 C | 4/2000 |
| EP | 0484628 | 5/1986 |
| TW | 389296 | 5/2000 |
| TW | 395477 | 6/2000 |
| TW | 479776 | 3/2002 |
| TW | 586601 | 5/2004 |
| TW | M268499 | 6/2005 |

* cited by examiner

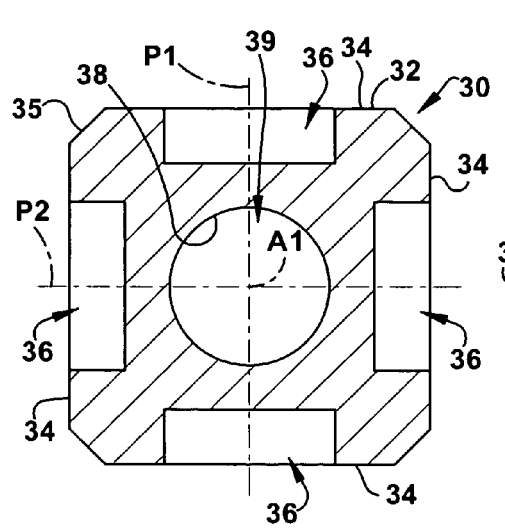
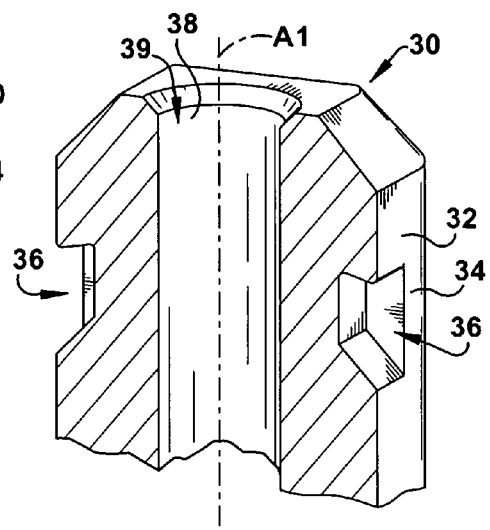
FIG. 3     FIG. 4
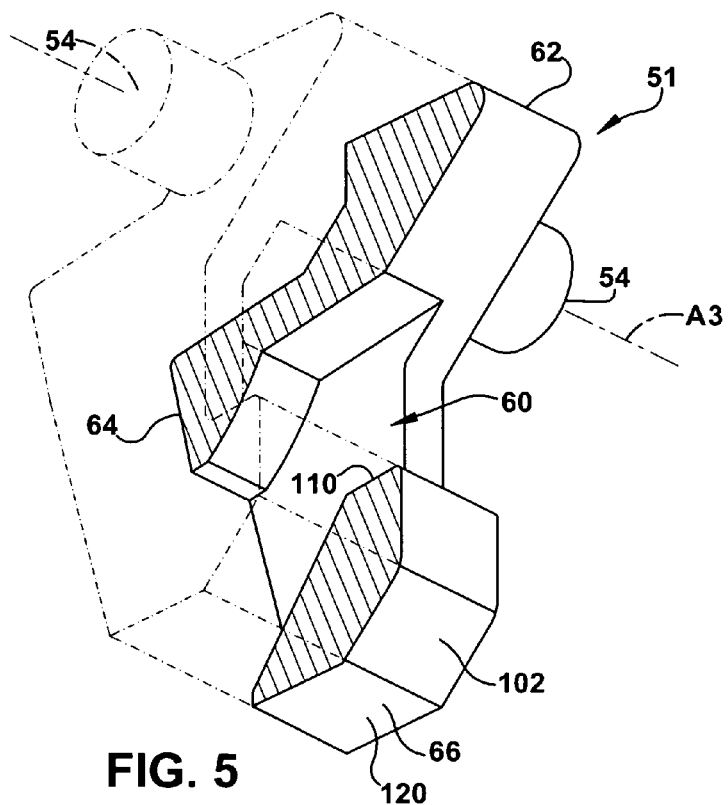
FIG. 5

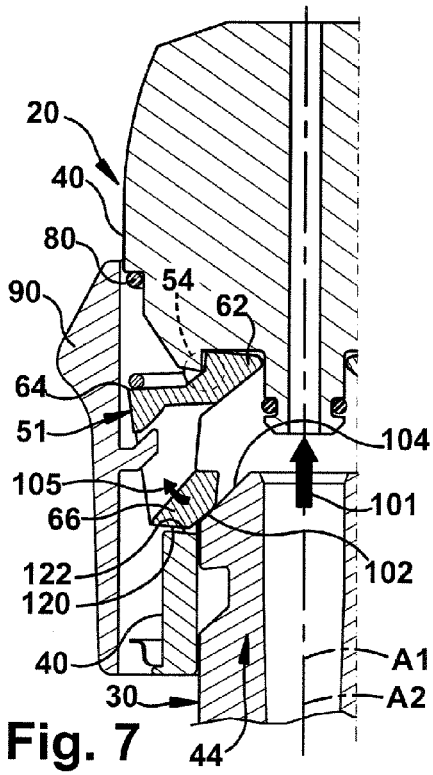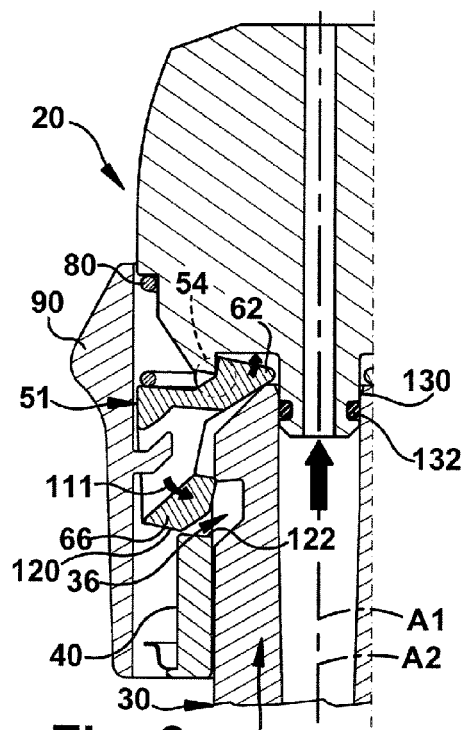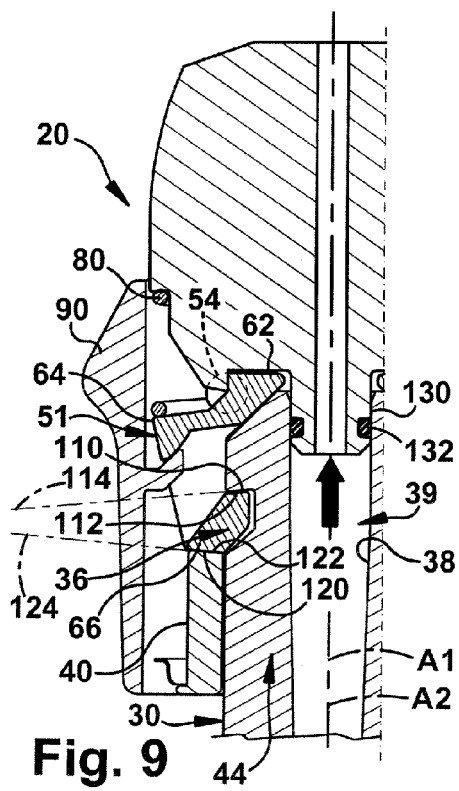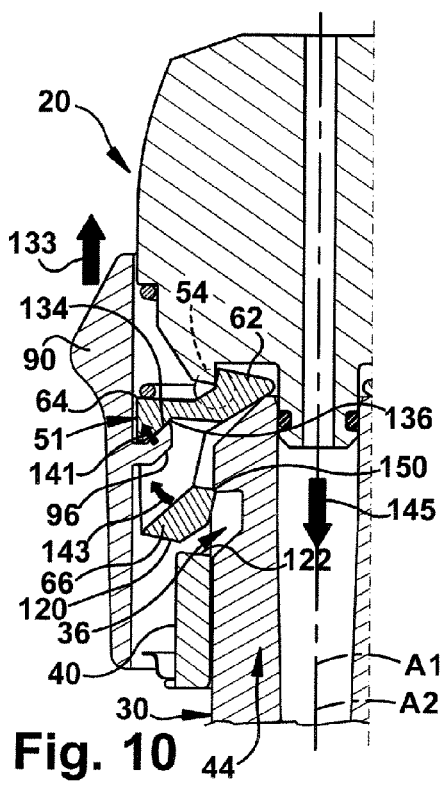

QUICK CONNECT COUPLING

CROSS-REFERENCE TO RELATED APPLICATION

This application claims the benefit of U.S. Provisional Application No. 60/738,672, filed Nov. 21, 2005.

TECHNICAL FIELD

This application relates to quick connect couplings for a fluid line.

BACKGROUND

A pressure washer forces liquid under high pressure through a lance and a nozzle at the end of the lance. The nozzle is removably coupled to the lance by means of a quick connect coupling.

SUMMARY

A socket of a fluid coupling device includes a housing with a cavity centered on an axis. A pawl is attached to the housing, is pivotable about a pivot location relative to the housing, and has a catch section located axially outward from the pivot location. A spring biases the catch section radially inward. A plug is configured to move axially into the cavity while sliding against the catch section to move the catch section radially outward, against bias of the spring, out of the way of the plug. After an axially-outwardly facing catch surface of the plug passes the catch section, the catch section can pivot radially inward and abut the plug catch surface to capture the plug in the socket.

Preferably, the spring biases the catch surface radially inward by applying an axially-outward force to the pawl at a location radially outward from the pivot location. An axially-inward facing catch surface of the catch section is configured to abut the plug catch surface to capture the plug and is inclined axially and radially inward so that a force urging the plug axially outward will urge the catch section radially inward. The catch section has an axially-outwardly facing abutment surface configured to abut an axially-inwardly facing abutment surface of the housing to resist a force urging the plug axially outward. The pawl has a release section, located radially outward from the pivot location, configured to be pushed axially inward to pivot the catch section radially outward to release the plug. A radially-inwardly facing surface surrounding the cavity is shaped relative to a radially-outer surface of the plug to enable the plug to be inserted in any of only a finite number of orientations, the number being greater than one.

BRIEF DESCRIPTION OF THE DRAWINGS

FIG. 3 is a top sectional view of the plug taken along line 3-3 of FIG. 2;

FIG. 4 is a perspective sectional view of the plug;

FIG. 5 is a perspective sectional view of one of the pawls;

FIGS. 6-9 are sectional views illustrating a sequence of steps for coupling the plug to the socket; and FIG. 10 is a sectional view illustrating a step for uncoupling the plug from the socket.

DESCRIPTION

Figure 1:
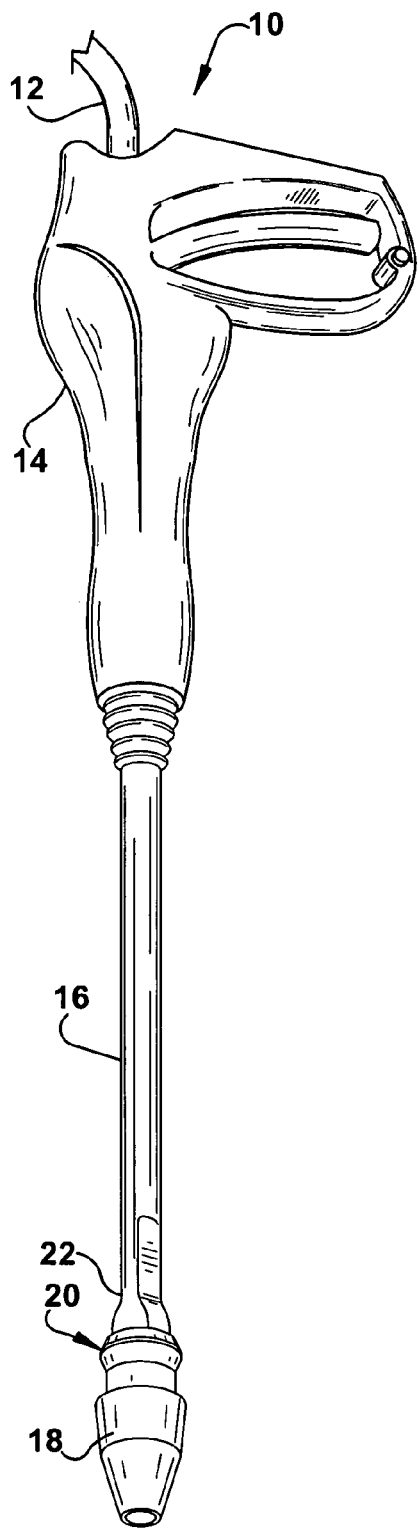
FIG. 1 is a perspective view of a spray gun.

The apparatus 10 shown in FIG. 1 has parts that are examples of the elements recited in the claims. The apparatus thus includes examples of how a person of ordinary skill in the art can make and use the claimed invention. It is described here to meet the requirements of enablement and best mode without imposing limitations that are not recited in the claims.

Figure 2:
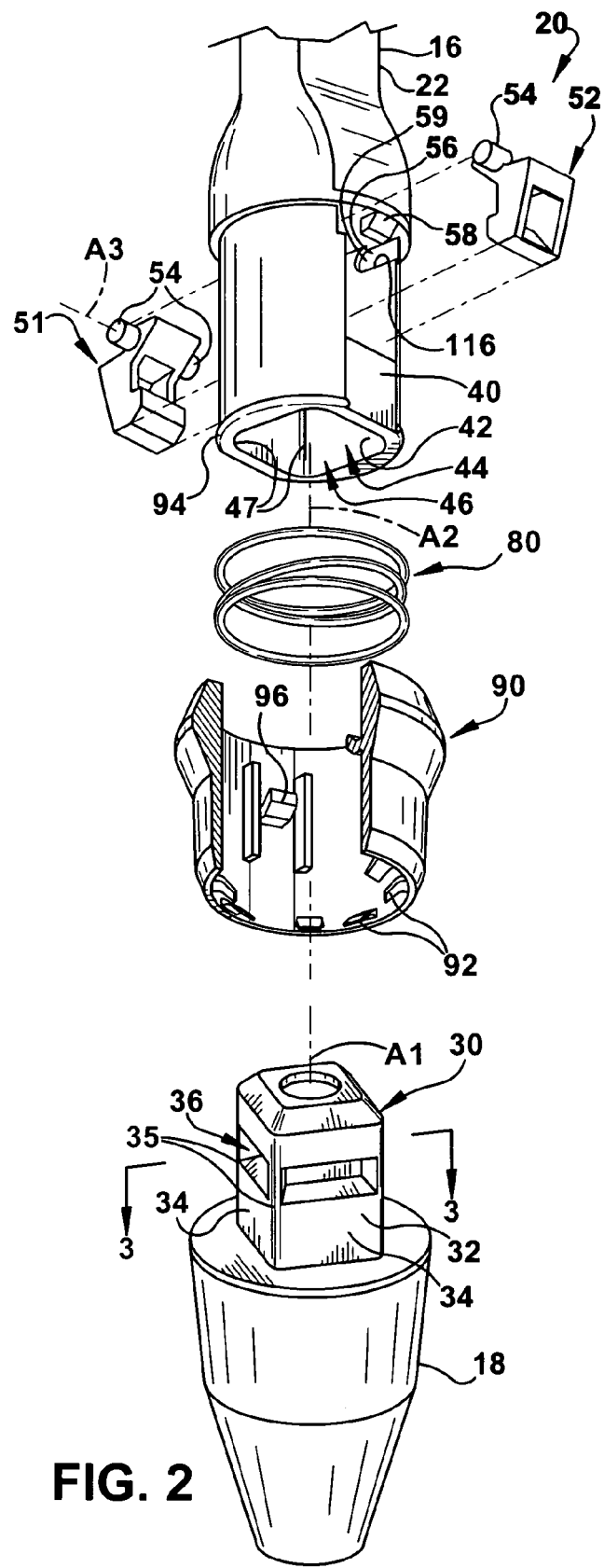
FIG. 2 is an exploded view of a coupling of the spray gun, including a plug and a socket with two pawls.

The apparatus 10 is a spray gun. It includes a hose 12, a handle 14, a lance 16 and a nozzle 18 connected in series. The hose 12 can be connected to a pressure washer base that forces a liquid through the hose 12. The liquid exits the nozzle 18 in the form of a pressurized spray for removing dirt from household surfaces. As shown in FIG. 2, the lance 16 includes a socket 20 adjoined to a tube 22. The nozzle 18 is adjoined to a plug 30. The plug 30 and the socket 20 together comprise a quick-connect coupling for coupling the nozzle 18 to the lance 16.

As shown in FIGS. 3-4, the plug 30 is centered on an axis A1. It has a side surface 32 with a transverse cross-section (FIG. 3) that is symmetric about two perpendicular planes P1 and P2 and yields the same shape when rotated a quarter turn about the axis A1. The cross-section 32 is generally square, with four sides 34 and four corners 35. A pocket 36 extends radially inward from each side 34. A cylindrical inner surface 38 of the plug 30 defines a bore 39.

As shown in FIG. 2, the socket 20 includes a housing 40 centered on an axis A2. The housing 40 has an inner surface 42 defining a cavity 44, and a front opening 46. The inner surface 42 has a generally square transverse cross-section with four corners 47, to match the transverse cross-section 32 (FIG. 3) of the plug 30. The corners 47 of the socket 20 are configured to closely receive and catch the corners 35 of the plug 30 to prevent the plug 30 from rotating. The plug 30 can be inserted into the cavity 44 in only a finite number of possible circumferential orientations. The finite number is an even number, and is optimally four as in this example.

Two pawls 51 and 52 are located diametrically opposite each other. Each pawl 51 and 52 has two oppositely projecting posts 54 centered on a common pivot axis A3. The posts 54 are loosely captured in slots 56 of the housing 40 by lugs 58. This centers the axes A3 on pivot locations 59 about which the pawls 51 and 52 can pivot relative to the housing 40.

The pawls 51 and 52 are alike and can be described as follows with respect to the first pawl 51 shown in FIGS. 5-6. In the following description, the terms "axially" and "radially" are with respect to the central axis A2 extending through the socket opening 46 into the cavity 44. Accordingly, the terms "axially inner" and "axially outer" respectively mean "upper" and "lower" with respect to the orientation of the parts shown in the drawings.

The pawl 51 has a central opening 60 below the posts 54. Above the opening 60, the pawl 51 has a radially-inner section 62 located radially inward from the posts 54 and a radially-outer section 64 located radially outward from the posts 54. Below the opening 60, the pawl 51 has an axially-outer, i.e., "lower", catch section 66.

Figure 6:
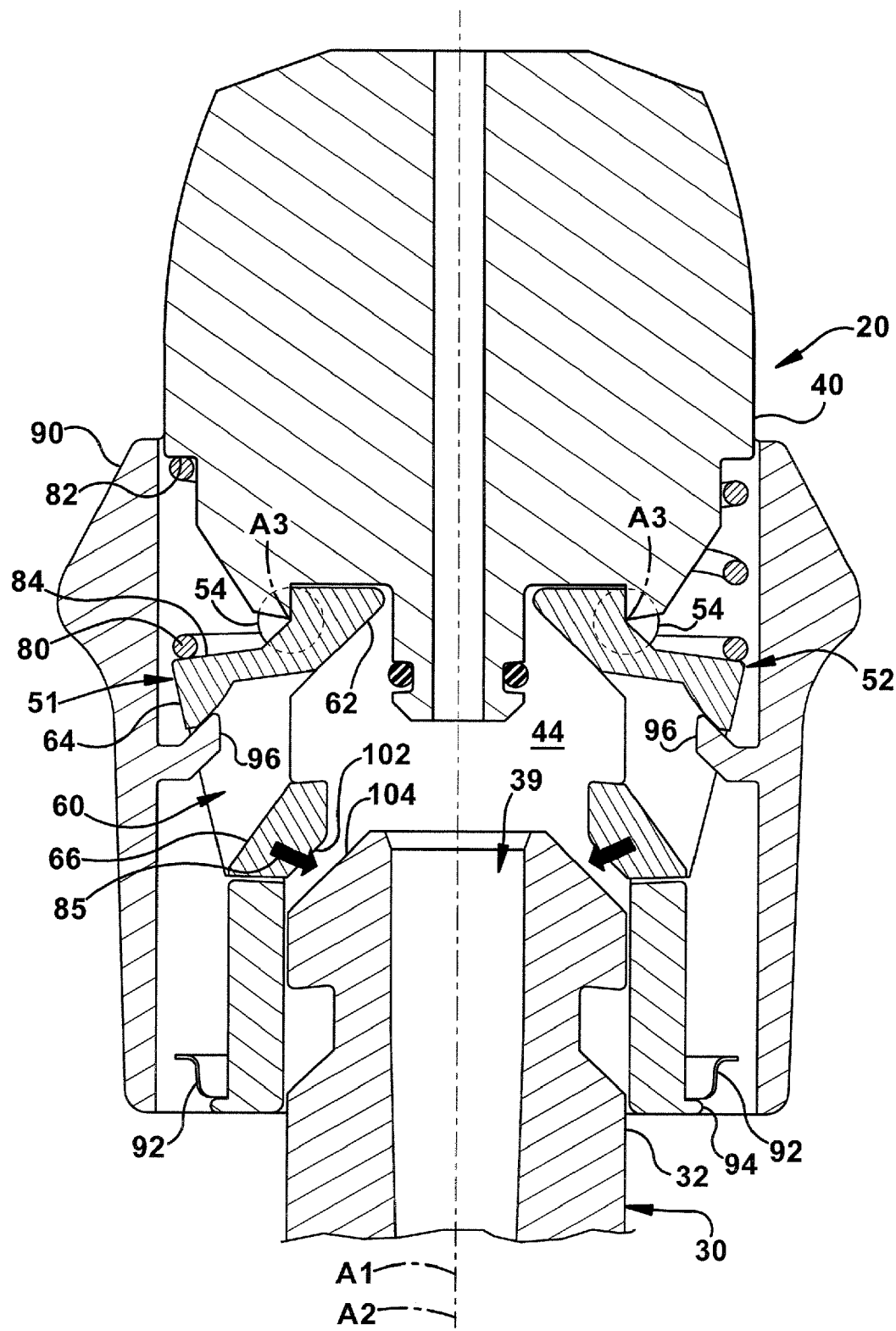

As shown in FIG. 6, a spring 80 is centered on the housing axis A2 and wrapped circumferentially about the housing 40. The spring 80 is compressed by and between a downward-facing spring-bearing surface 82 of the housing 40 and an upward-facing spring-bearing surface 84 of the radially-outer section 64 of each pawl 51 and 52. The spring 80 applies a directly-axial force to the radially-outer pawl section 64 urging it downward. This pivotally biases each pawl 51 and 52 into an initially closed position in which the pawl's lower section 66 is urged radially inward (arrows 85) into the path of the plug 30 entering the cavity 44.

A release ring 90 is slid upward into an installed position shown in FIG. 6 in which the ring 90 surrounds the housing 40. As the ring 90 is slid upward, elastic catches 92 in the ring 90 slide over a rib 94 of the housing 40. Thereafter, abutment between the catches 92 and the rib 94 prevents the ring 90 from slipping off the housing 40. The ring 90 has two hooks 96 spaced symmetrically about the axis A2. Each hook 96 extends through the opening 60 of the adjacent pawl 51 or 52 to engage the radially-outer pawl section 64. The radially-outer pawl section 64, urged downward by the spring 80, biases the hook 96 downward and thus biases the entire ring 90 downward.

In the following procedure for coupling the plug 30 to the socket 20, the pawls 51 and 52 function in the same manner. The procedure can therefore be described with reference to the first pawl 51:

A first step of the procedure is illustrated in FIG. 7. As the plug 30 is inserted (arrow 101) into the cavity 44 of the socket 20, a slide surface 102 of the lower pawl section 66 slides against a beveled surface 104 of the plug 30. Both surfaces 102 and 104 are inclined axially and radially inward, so that upward movement of the plug 30 moves the lower pawl section 66 radially outward (arrow 105), against bias of the spring 80, into an open position in which the lower pawl section 66 is out of the way of the plug 30.

Next, as shown in FIG. 8, the plug 30 pushes the radially-inner pawl section 62 upward. This helps the spring 80 pivot the lower pawl section 66 radially inward (arrow 111) back into the closed position shown in FIG. 9. Thereafter, the spring bias retains the pawl 51 in its closed position, with the lower pawl section 66 extending into the pocket 36 of the plug 30 to capture the plug 30 in the socket 20.

In its captured condition shown in FIG. 9, the plug 30 is prevented from being withdrawn by an upward-facing catch surface 110 of the lower pawl section 66 catching onto and abutting a downward-facing catch surface 112 of the plug pocket 36. Both surfaces 110 and 112 are tapered slightly downward in the radially-outward direction as indicated by dashed line 114. This causes any downward force urging the plug 30 out of the socket 20 to reinforce the spring bias in urging the lower pawl section 66 into the pocket 36.

The downward force urging the plug 30 out of the socket 20 is resisted by the posts 54 pulling against the bottom edge 116 (FIG. 2) of the slot 56. This places the pawl 51 in tension between the lower pawl section 66 and the posts 54.

The downward force is resisted also by a downward-facing abutment surface 120 of the lower pawl section 66 abutting an upward-facing abutment surface 122 of the socket housing 40. This places the lower pawl section 66 under compression between its upward-facing catch surface 110 and its downward-facing abutment surface 120. The abutment surfaces 120 and 122 are tapered slightly upward in the radially-outward direction as indicated by dashed line 124. Therefore, any downward force urging the plug 30 out of the cavity 44 reinforces the spring bias in urging the lower pawl section 66 into the pocket 36. The loose containment of the posts 54 by the slots 56 (FIG. 2) enables the pawl 51 to rise above the upward-facing abutment surface 122 when the plug 30 is absent.

In this example, the force urging the plug 30 axially outward is partially born by the posts 54 and partially born by the abutment surfaces 120 and 122. In another example, the force is fully born by the posts 54 and not by the abutment surfaces 120 and 122, so that the abutment surfaces 120 and 122 do not need to abut each other. In yet another example, the force is fully born by the abutment surfaces 120 and 122 and not by the posts 54, so that the posts 54 can be suspended in the slots 56 (FIG. 2) without contacting the slot edge 116 and the midsection of the pawl 51 is not in tension.

During the coupling procedure described above, a hollow stem 130 of the socket 20 enters the bore 39 of the plug 30. An O-ring 132 is seated in a groove of the stem 130. The O-ring 132 and the bore surface 38 form an air-tight seal surrounding the stem 130. A fluid can flow through the stem 130 and the bore 39 to the nozzle 18 (FIG. 1).

To release the plug 30, the release ring 90 is slid upward (arrow 133) as shown in FIG. 10. This causes a slide surface 134 of the ring's hook 96 to slide upward against a slide surface 136 of the radially outer pawl section 64. The hook's slide surface 134 is inclined, facing upward and radially outward, and the pawl's slide surface 136 is inclined, facing downward and radially inward. Therefore, the upward movement of the hook 96 imparts to the radially-outer pawl section 64 a force (arrow 141) that is angled upward and axially outward. This pivots (arrow 143) the lower pawl section 66 out of the plug pocket 36 to release the plug 30. It also pivots the radially-inner pawl section 62 downward. This, in turn, pushes the plug 30 downward (arrow 145) to bring the plug pocket 36 below a radially innermost point 150 of the lower pawl section 66, to prevent the lower pawl section 66 from reentering the pocket 36 when the user releases the ring 90. The user can then withdraw the plug 30 from the socket cavity 44.

There are more pockets 36 than pawls 51 and 52. Since each pocket 36 can receive each pawl 51 or 52, the number of possible circumferentially different orientations of the plug 30 equals the number of pockets 36.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. A fluid coupling device comprising:
   a socket including:
      a housing having a cavity and an opening to the cavity, with an axis extending through the cavity and the opening;
      a pawl attached to the housing, pivotable about a pivot location relative to the housing, and having a catch section located axially outward from the pivot location; and
      a spring biasing the catch section radially inward; and
   a plug having an axially-outwardly facing catch surface;
   configured for the plug to move axially through the socket opening into the cavity while sliding against the catch section to pivot the catch section radially outward, against the spring bias, out of the way of the plug until the plug's catch surface passes the pawl's catch section to enable the catch section to pivot radially inward and abut the plug's catch surface to capture the plug in the socket;
   the socket providing the pawl sufficient room to achieve the radially-outward pivoting and the radially-inward pivoting of the pawl's catch section without requiring manually moving any part of the socket out of the way of the pawl.

2. The device of claim 1 wherein the spring biases the catch surface radially inward by applying an axially-outward force to the pawl at a location radially outward from the pivot location.

3. The device of claim 1 wherein said sliding is sliding of the plug against a slide surface of the catch section, the slide surface being inclined axially and radially inward.

4. The device of claim 1 wherein an axially-inward facing catch surface of the catch section is configured to abut the plug catch surface to capture the plug and is inclined axially and radially inward so that a force urging the plug axially outward will urge the catch section radially inward.

5. The device of claim 1 wherein the catch section has an axially-outwardly facing abutment surface configured to abut an axially-inwardly facing abutment surface of the housing to resist a force urging the plug axially outward.

6. The device of claim 1 wherein the pawl has a release section, located radially outward from the pivot location, configured to be pushed axially inward to pivot the catch section radially outward to release the plug.

7. The device of claim 1 wherein a radially-inwardly facing surface surrounding the cavity is shaped relative to a radially-outer surface of the plug to enable the plug to be inserted in any of only a finite number of orientations, the number being greater than one.

8. A fluid coupling device comprising:
a socket including:
a housing having a cavity and an opening to the cavity, with an axis extending through the cavity and the opening;
a pawl attached to the housing, pivotable about a pivot location relative to the housing, and having an axially-inward facing catch surface located axially outward from the pivot location; and
a spring biasing the catch surface radially inward; and
a plug having a catch surface, and configured to be inserted through the opening into the cavity into a captured condition in which the plug catch surface faces axially outward, and withdrawal of the plug is prevented by the pawl catch surface abutting the plug catch surface, and from which the plug can be released by pivoting the pawl catch surface radially outward, against the spring bias, away from the plug;
the pawl catch surface being inclined axially and radially inward when the plug is in the captured condition, whereby an axially outward force applied to the pawl catch surface will urge the pawl catch surface radially inward.

9. The device of claim 8 wherein the plug catch surface is inclined to match the incline of the catch surface of the pawl.

10. A fluid coupling device comprising:
a socket including:
a housing having a cavity and an opening to the cavity, with an axis extending through the cavity and the opening; and
a pawl attached to the housing, pivotable about a pivot location relative to the housing, and having an axially-inward facing catch surface located axially outward from the pivot location and an axially-outward facing abutment surface located axially outward from the catch surface; and
a plug configured to extend through the opening and be releasably captured in the cavity by the pawl catch surface abutting an axially-outward facing catch surface of the plug while the pawl abutment surface abuts an axially-inwardly facing abutment surface of the housing.

11. The device of claim 10 configured for a force urging the plug axially outward to be fully borne by the two abutment surfaces.

12. The device of claim 10 wherein the pawl abutment surface is tapered axially inward in the radially outward direction so that an axially outward force applied to the plug will urge the catch surface radially inward.

13. A fluid coupling device comprising:
a socket including:
a housing having a cavity and an opening to the cavity, with an axis extending through the cavity and the opening;
a pawl attached to the housing, pivotable about a pivot location relative to the housing, and having a release section located radially outward from the pivot location and a catch section located axially outward from the pivot location; and
a spring biasing the catch section radially inward; and
a plug configured to extend through the opening and be releasably captured in the cavity by the catch section abutting an axially-outwardly facing catch surface of the plug, and to be released from the cavity by applying to the release section a force directed both axially inward and radially outward to pivot the catch section radially outward.

14. The device of claim 13 further comprising a release device slidably attached to the housing, having a radially-outwardly facing slide surface that slides against a radially-inwardly facing slide surface of the pawl release section as the release device is manually slid axially inward to pivot the catch section radially outward.

15. A fluid coupling device comprising:
a socket including:
a housing having a cavity and an opening to the cavity, with an axis extending through the cavity and the opening;
one or more pawls, each pivotably attached to the housing and having a catch section; and
a spring biasing the catch sections radially inward; and
a plug configured to be inserted through the opening into the cavity and having a number of separate pockets exceeding the number of pawls, the pockets being symmetrically spaced circumferentially about the axis, with each pawl catch section being capable of insertion by the spring bias into any one of the pockets to capture the plug in the cavity.

16. The device of claim 15 wherein the number of pockets is four.

17. A fluid coupling device comprising:
a socket including:
a housing having a cavity and an opening to the cavity, with an axis extending through the cavity and the opening; and
a pawl attached to the housing, pivotable about a pivot location relative to the housing, and having a catch section located axially outward from the pivot location, the pawl further having a locking section located radially inward from the pivot location and axially inward from the pawl's catch section; and
a plug configured to move axially through the opening into the cavity and push the locking section axially inward, which forces the catch section to pivot radially inward and catch onto the plug to capture the plug in the cavity.

18. A fluid coupling device comprising:

a socket including:

a housing having a cavity and an opening to the cavity, with an axis extending through the cavity and the opening;

a release device slidably attached to the housing;

a pawl attached to the housing, pivotable about a pivot location relative to the housing, and a catch section located axially outward from the pivot location; and a spring biasing the catch section radially inward; and a plug configured to be moved, while the release device is in an un-retracted position, axially inward through the opening into the cavity into a captured position in which the plug is captured in the cavity by the catch section abutting an axially-outwardly facing catch surface of the plug, and configured to be released from the cavity by retracting the release device axially inward from its un-retracted position, against the spring bias, for the release device to pivot the catch section radially outward.

19. A fluid coupling device comprising:

a socket including:

a housing having a cavity and an opening to the cavity, with an axis extending through the cavity and the opening;

a pawl pivotable about a pivot location relative to the housing, the pawl having a release section located radially outward from the pivot location, a catch section located axially outward from the pivot location, and a plug-ejector section spaced radially inward from the pivot location and axially-inward from the catch section; and a plug configured to extend through the opening and be captured in the cavity by the catch section, and configured to be released from the cavity by pivoting the pawl's release section axially-inward which both pivots the pawl's catch section radially outward to release the plug and pivots the pawl's plug-ejector section axially outward for the plug-ejector section to push the plug axially outward.

* * * * *

UNITED STATES PATENT AND TRADEMARK OFFICE
CERTIFICATE OF CORRECTION

PATENT NO.       : 7,431,346 B2
APPLICATION NO.  : 11/348430
DATED            : October 7, 2008
INVENTOR(S)      : Brian L. Frost et al.

It is certified that error appears in the above-identified patent and that said Letters Patent is hereby corrected as shown below:

On the Title Page Item (75), Inventor, "Roger E. DeYoung" should read -- Roger L. DeYoung --.

Signed and Sealed this

Second Day of December, 2008

JON W. DUDAS
*Director of the United States Patent and Trademark Office*